US009405551B2

(12) United States Patent
Yamada et al.

(10) Patent No.: US 9,405,551 B2
(45) Date of Patent: Aug. 2, 2016

(54) CREATING AN ISOLATED EXECUTION ENVIRONMENT IN A CO-DESIGNED PROCESSOR

(71) Applicant: Intel Corporation, Santa Clara, CA (US)

(72) Inventors: Koichi Yamada, Los Gatos, CA (US); Palanivel Rajan Shanmugavelayutham, San Jose, CA (US); Scott D. Rodgers, Hillsboro, OR (US); Barry E. Huntley, Hillsboro, OR (US); James D. Beaney, Jr., Raleigh, NC (US); Boaz Tamir, Zhichron Yaacov (IL)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 13/795,720

(22) Filed: Mar. 12, 2013

(65) Prior Publication Data

US 2014/0281376 A1    Sep. 18, 2014

(51) Int. Cl.
G06F 15/00 (2006.01)
G06F 15/76 (2006.01)
G06F 9/38 (2006.01)
G06F 9/44 (2006.01)
G06F 9/455 (2006.01)

(52) U.S. Cl.
CPC .............. G06F 9/3885 (2013.01); G06F 9/44 (2013.01); G06F 9/45516 (2013.01); G06F 9/45533 (2013.01)

(58) Field of Classification Search
CPC .............................. G06F 9/30036; G06F 9/455
See application file for complete search history.

(56) References Cited

U.S. PATENT DOCUMENTS

| 5,345,576 A | 9/1994 | Lee et al. |
| 5,349,651 A | 9/1994 | Hetherington et al. |
| 5,524,208 A | 6/1996 | Finch et al. |
| 5,752,272 A | 5/1998 | Tanabe |
| 5,826,089 A | 10/1998 | Ireton |
| 5,926,832 A | 7/1999 | Wing et al. |

(Continued)

FOREIGN PATENT DOCUMENTS

| CN | 101923492 A | 12/2010 |
| EP | 1316882 | 4/2003 |

(Continued)

OTHER PUBLICATIONS

"Approach of Supporting Virtualization by Intel," Virtualization Technology Expert, Mar. 1, 2007, first edition, Technology Criticism Co., Ltd., p. 168-173, ISBN97 8-4-7741-3037-8 ("Approach of Supporting Virtualization").

(Continued)

*Primary Examiner* — Hyun Nam
(74) *Attorney, Agent, or Firm* — Trop, Pruner & Hu, P.C.

(57) ABSTRACT

In an embodiment, a processor includes a binary translation (BT) container having code to generate a binary translation of a first code segment and to store the binary translation in a translation cache, a host entity logic to manage the BT container and to identify the first code segment, and protection logic to isolate the BT container from a software stack. In this way, the BT container is configured to be transparent to the software stack. Other embodiments are described and claimed.

19 Claims, 6 Drawing Sheets

(56) References Cited

U.S. PATENT DOCUMENTS

| | | |
|---|---|---|
| 6,615,340 B1 | 9/2003 | Wilmot |
| 6,631,514 B1 | 10/2003 | Le |
| 7,111,096 B1 | 9/2006 | Banning et al. |
| 7,269,825 B1 | 9/2007 | Adcock |
| 7,644,210 B1 | 1/2010 | Banning et al. |
| 7,734,895 B1* | 6/2010 | Agarwal ............... G06F 8/52 712/13 |
| 8,127,121 B2 | 2/2012 | Yates et al. |
| 8,464,035 B2 | 6/2013 | Dixon et al. |
| 8,775,153 B2 | 7/2014 | Winkel et al. |
| 2002/0059268 A1* | 5/2002 | Babaian ............... G06F 9/45504 |
| 2002/0156977 A1 | 10/2002 | Derrick et al. |
| 2004/0015874 A1* | 1/2004 | Ungar ................. G06F 11/3636 717/127 |
| 2005/0086451 A1 | 4/2005 | Yates et al. |
| 2007/0283100 A1 | 12/2007 | Asano et al. |
| 2007/0294702 A1 | 12/2007 | Melvin et al. |
| 2008/0270740 A1 | 10/2008 | Wang et al. |
| 2009/0031082 A1 | 1/2009 | Ford et al. |
| 2009/0204785 A1 | 8/2009 | Yates et al. |
| 2009/0228657 A1 | 9/2009 | Hagiwara |
| 2009/0254709 A1* | 10/2009 | Agesen ................ G06F 8/52 711/118 |
| 2010/0070708 A1 | 3/2010 | Maruyama |
| 2011/0153307 A1 | 6/2011 | Winkel et al. |
| 2011/0154079 A1 | 6/2011 | Dixon et al. |
| 2011/0154090 A1 | 6/2011 | Dixon et al. |
| 2011/0167416 A1 | 7/2011 | Sager |
| 2011/0320766 A1* | 12/2011 | Wu ...................... G06F 9/30076 712/28 |
| 2012/0144167 A1 | 6/2012 | Yates et al. |
| 2012/0233477 A1 | 9/2012 | Wu et al. |
| 2013/0185580 A1 | 7/2013 | Dixon et al. |
| 2013/0283249 A1* | 10/2013 | Kanhere .............. G06F 8/40 717/139 |

FOREIGN PATENT DOCUMENTS

| | | |
|---|---|---|
| JP | 05-081070 | 2/1993 |
| JP | 2003-196107 | 7/2003 |
| JP | 2011134315 | 7/2011 |
| WO | 9532460 | 11/1995 |
| WO | 2012005949 | 1/2012 |

OTHER PUBLICATIONS

Japan Patent Office, Japanese Office Action mailed Feb. 24, 2015, in Japanese Patent Application No. 2014-042957.
Korean Patent Office, Office Action mailed Apr. 28, 2015, in Korean Application No. 10-2014-29253.
Amit Vasudevan, et al., "Stealth Breakpoints," 2005, pp. 1-10.
Shiliang Hu, et al., "Reducing Startup Time in Co-Designed Virtual Machines," 2006, pp. 1-12.
Shiliang Hu, "Efficient Binary Translation in Co-Designed Virtual Machines," 2006, pp. 1-183.
Ho-Seop Kim, et al., "Hardware Support for Control Transfers in Code Caches," 2003, pp. 1-12.
Ho-Seop Kim, "A Co-Designed Virtual Machine for Instruction-Level Distributed Processing," 2004, pp. 1-205.
Jiwei Lu, et al., "Design and Implementation of a Lightweight Dynamic Optimization System," 2004, pp. 1-24.
Great Britain Patent Office, Office Action mailed Sep. 16, 2014, in Great Britain Application No. 1404228.7.
International Application No. PCT/US13/28233, filed Feb. 28, 2013, entitled "Performing Security Operations Using Binary Translation," by Intel Corporation.
Amit Vasudevan, et al., "Stealth Breakpoints," 2005, 10 pages.
Shiliang Hu, et al., "Reducing Startup Time in Co-Designed Virtual Machiens," 2006, 12 pages.
Shiliang Hu, "Efficient Binary Translation in Co-Designed Virtual Machines," 2006, 183 pages.
Ho-Seop Kim, et al., "Hardware Support for Control Transfers in Code Caches," 2003, 12 pages.
Ho-Seop Kim, "A Co-Designed Virtual Machine for Instruction-Level Distributed Processing," 2004, 205 pages.
Jiwei Lu, et al., "Design and Implementation of a Lightweight Dynamic Optimization System," 2004, 24 pages.
Great Britain Patent Office, Examination Report mailed Sep. 30, 2015, in Great Britain Patent Application No. GB1404228.7.

* cited by examiner

CREATING AN ISOLATED EXECUTION ENVIRONMENT IN A CO-DESIGNED PROCESSOR

BACKGROUND

Modern microprocessors are at the heart of most computer systems. In general, these processors operate by receiving instructions and performing operations responsive to the instructions. For application programs and operating system (OS) activities, instructions may be received in a processor which then decodes these instructions into one or more smaller operations, often termed micro-instructions (uops), that are suitable for execution on the processor hardware. Some processors lack hardware features to directly perform certain instruction set architecture (ISA) instructions. It is for this reason that instructions are decoded into uops, which can be directly executed on the hardware. Decoding to uops allows the processor to schedule and execute in parallel and out of order, helping improve the performance. Yet this mechanism may be insufficient in many cases.

DETAILED DESCRIPTION

Figure 1:
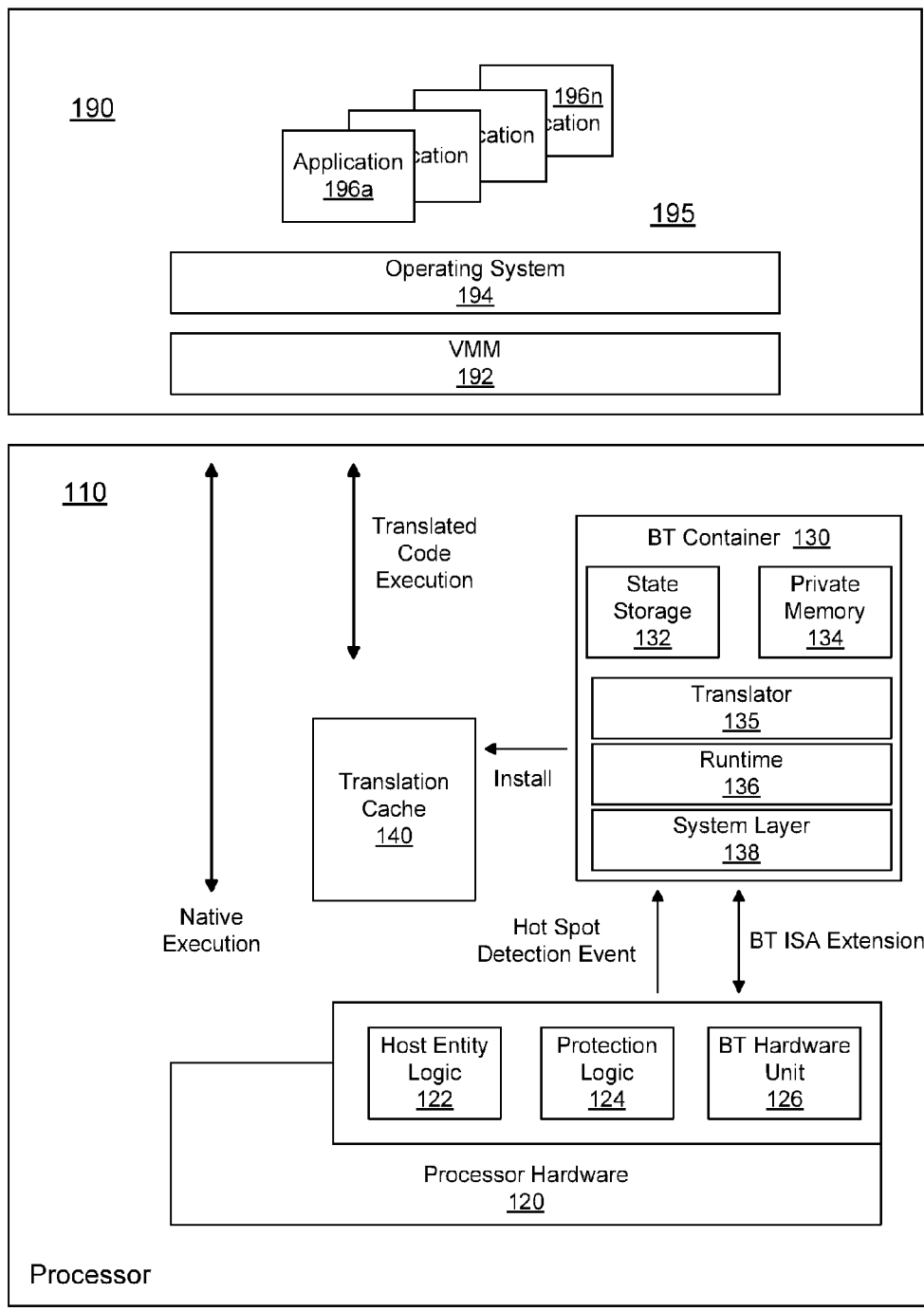
FIG. 1 is a block diagram of a portion of a system in accordance with an embodiment of the present invention.

In various embodiments, a co-designed processor architectural framework is provided to maintain binary translation software hidden from a software stack above the firmware layer. This software stack includes a virtual machine monitor (VMM), operating system (OS) and applications that execute on one or more cores of the processor. In this way, embodiments may avoid modification to any layer of the software stack above the firmware. As such, this stack may benefit from dynamic binary optimization and instruction set architecture (ISA) emulation systems. Even though this architectural framework is provided to execute BT software transparently from VMM, OS and applications, it also can be used to run a different type of software component of a co-designed processor and enable a different type of usage. For example this framework may be used to execute any software (for example virus scanning software) that is to run in a hidden environment (e.g., hidden from VMM/OS layers). This hidden environment is an isolated, independent and protected execution environment with respect to VMM, OS and applications.

A hardware/software co-designed processor through binary translation enables dynamic binary optimizations and translations through hidden binary translation (BT) software. It can deliver increased performance in a power efficient fashion and also enable new ISA extensions through binary translation. In a co-designed processor a standard ISA referred to as a source ISA, for example, the x86 ISA is present. Conventional software, including both the OS and application programs, is compiled to the source ISA. In turn, the hardware of a co-designed processor implements a target ISA designed specifically for a given hardware implementation with special performance and/or energy efficiency features. The target ISA is at the same level as uops and may be identical to the set of uops.

The emulation software belonging to the co-designed processor directs the execution of application/OS source ISA software either by interpreting it or by directly translating it into optimized sequences of target instructions. Such translation promises performance gains and/or improved energy efficiency.

The emulation process typically proceeds as follows. Interpretation is used for code (source ISA instructions) when it is first encountered. Then, as frequently executed code regions (hotspots) are discovered through dynamic profiling or some other means, they are translated to the target ISA. Optimization is often done as part of the translation process; code that is very heavily used may later be optimized even further. The translated regions of code are held in a translation cache so they can be re-used. The translation cache is managed by emulation software and is held in a section of memory that is concealed from all application/OS software. The application/OS software is held in conventional (visible) memory.

Previous processor implementations employing co-designed VMs employ full emulation, in which the emulation software emulates all application/OS software. One disadvantage of full emulation is that all code must first be interpreted and/or translated before it can be executed, and this may lead to low performance when a region of software is first encountered.

Embodiments may use both hardware and processor firmware-based mechanisms to create an isolated and hidden virtual machine execution environment, referred to herein as a binary translation (BT) container. This container may be used to execute BT software to implement a partial translation or full ISA emulation model. In an embodiment, the BT container is essentially a special (and in some embodiments a simplified) version of a virtual machine environment directly controlled by processor firmware. In various embodiments, the container is designed to be hidden and transparent from the software stack including VMM, operating system and applications.

During operation, the BT container interacts with a variety of components and mechanisms. First, a processor includes a host entity to manage the BT container. In different embodiments, this entity may be implemented by a combination of processor hardware extensions and firmware (e.g., a microcode layer or a processor abstraction layer). As will be described herein, the host entity controls entry into and exit out of the BT container and ISA exposed to the software running inside the BT container.

The BT container environment includes the processor state for BT software and private memory space that holds code and data for BT software. The BT software executes within this BT container and implements one or more binary translation algorithms for performing optimizations and ISA compatibility operations.

Various embodiments may provide hardware-based protection mechanisms that are used to protect the BT container memory from software (VMM, OS and applications) and hardware attackers. In one embodiment this protection mechanism can be implemented with memory range register-based protection, memory encryption hardware, and so forth. In different implementations, the level of the protection provided may be based on the features used and security objectives desired.

A BT hardware unit is provided to implement hardware support for the co-designed processor. In an embodiment, this unit includes hardware support to detect events to invoke the BT container, including hot spot detection, self-modifying code detection, among other events, such as inter-processor interrupt (IPI) events, power management events, reliability availability serviceability (RAS) events, among others. More generally, these events may receive immediate attention from BT software. For example, one event may be a private IPI mechanism defined to synchronize among BT software running on multiple processors.

To enable control transfers into/from the BT container and various operations within the container, BT ISA extensions may be provided. In an embodiment, these ISA extensions may be available exclusively to BT software running inside the BT container. For purposes of example, these ISA extensions allow BT software to access and program the BT hardware unit, communicate with the host entity for configuring the container policies and accessing the original code memory space for binary translation.

In an embodiment, a translation cache memory may be provided to store translated code. The transition to the translated code execution is governed by the translation entry mechanism provided by the BT hardware unit, in an embodiment. The BT container environment, including its private processor state and private memory space, may be isolated and hidden from other software (VMM, operating system and applications).

The BT container resources may be allocated and created by the host entity during system boot. It is at this point that the hardware protection mechanisms can be programmed and managed by the host entity.

In order to be transparent from OS and VMM, invocation and exit of the BT software in BT container are directly controlled by the host entity. In one embodiment, the invocation and exit operations are implemented with a combination of hardware and microcode. In another embodiment, processor firmware may be used to perform these operations.

As one control transfer operation, when the BT hardware unit detects a BT invocation event such as a hot spot, the processor stops execution of the guest software stack and notifies the host entity of the event. Then the host entity saves the current state of the processor context in a temporary state storage area, switches to the BT container context (which may be stored in a BT state storage within the BT container) and starts execution of the BT software from a defined entry instruction pointer (IP). Once the BT software obtains control, it executes until a voluntary exit occurs with a special exit instruction (which may be a BT ISA extension exposed to the BT container), or an involuntary exit is enforced by the host entity upon certain hardware events such as external interrupts, internal timer interrupts and so forth. Such internal timer interrupts are essentially time out events, which are hidden from VMM and OS, to allow the BT software to time-slice the long latency operation.

Transparency can also be achieved by well controlling and managing the BT software latency exposed to the software stack to meet forward progress requirement by this stack. For example, when BT software takes up to 1 millisecond (ms) to complete a translation task for the identified hotspot, the host entity may provide mechanisms for BT software to mitigate and control the latency exposed to the software. In an embodiment, these mechanisms include: 1) preemption of BT software (involuntary exits) upon external interrupts for minimizing the latency exposed to the OS interrupt handler; 2) the use of one or more internal timers to enable time quantum management (time slice scheduling) for BT software to meet minimum forward progress requirements of the underlying program execution; and 3) scheduling a long duration BT task to one or more idle cores to hide the BT software latency. These mechanisms are either pre-configured by the host entity or dynamically configured through BT ISA extensions exposed to the BT software.

Having an isolated container to run BT software also allows the host entity to control ISA features exposed to the BT container as well as privileges such as memory and processor resource access permissions given to BT software running inside the BT container. For example, the host entity can limit and control the ISA features exposed to the BT software if a subset of ISA features (e.g., no floating point ISA instructions) is sufficient to perform a given binary translation task. Such control may contribute to the simplification of the container environment and reduction of the context switch time between native and BT container execution.

Unlike a supervisor mode provided for running a hypervisor or VMM, the BT container is given minimal privileges and priority appropriate to operate, therefore significantly reducing the security risk and system impact such as latency exposures to the operating system, even if part of the ISA features are implemented through the BT software. In an embodiment, the host entity can limit and control BT software's ISA features and privileges such as system ISA features and time spent on BT execution, restricting the BT container to access only the information, resources, instructions and time quantum that are needed to operate for its legitimate purposes.

For example, the BT software can be exposed with only user level (e.g., ring 3) ISA access if this exposure is sufficient to perform the binary translation task. Such access exposure may be appropriate when the emulation to be performed in a partial translation model is for purposes of user-level applications. Furthermore, memory references to outside of the BT container memory can be restricted to only instruction pages of application software. Also, only read permission is given to the BT software if this permission is sufficient for the BT software to perform a binary translation task. Guest processor state access by the BT software can be limited to a subset of the guest processor states that are sufficient for the binary translation task. Stated another way, only the guest state that is required for translation is available for the BT software such that there is no access to processor resources unused by the BT software. In an embodiment, the host entity can also prevent BT software from accessing the guest kernel (e.g., ring 0) memory if binary translation is performed for application (namely user) software code only. This control enables the BT software to run with the least possible privileges and features sufficient to operate, which may contribute to increasing robustness and reducing the security risk of a HW/SW co-designed processor with simpler scope of system impact, changes and testing requirements, and enabling better system security.

Using an embodiment of the present invention, a partial translation model may be realized on one or more cores of a processor. In this way, an ISA can be virtualized to enable a number of BT usages and deliver higher performance per watt. One such example is using the BT mechanism for performing vector wide operations in a vector core having code written for non-vector width or lesser vector width hardware. In this way, a BT mechanism can translate software to use wider vector registers even though the original software is written for use on narrower previous generation vector registers or non-vector registers. In a particular example, software using streaming SIMD extensions (SSE) instructions of an Intel® ISA is translated to use Intel® ISA advanced vector extension (AVX) instructions instead. Still further, ISA compatibility can be realized with a smaller core size by providing ISA feature extensions through the BT mechanisms described herein, rather than including additional dedicated hardware for performing the feature. For example, a smaller core may not have AVX support and can have only SSE support. BT can translate software that uses AVX instructions to use SSE instructions instead. This provides ISA compatibility and fills the ISA gap of the smaller core.

Although this HW and SW co-designed framework may be used for BT as described herein, it can be used for enabling other usage models to increase processor features and values such as performance, power management and ISA extensions/emulations, without changes to an existing OS/VMM.

Note that in some embodiments, platform firmware components such as system management mode (SMM) may be located inside the trusted boundary of the BT container and BT software to co-exist with server reliability/availability/serviceability (RAS) features. However, in other embodiments such components may be located outside the trusted boundary with the certain HW extensions such as HW based memory encryption and integrity check to improve the resilience to SMM code and HW attacks against the software components of the HW and SW co-designed processor.

Referring now to FIG. 1, shown is a block diagram of a portion of a system in accordance with an embodiment of the present invention. As shown in FIG. 1, the portion of system 100 includes a co-designed processor 110 and its interaction with a software stack 190. While many different types of processor designs may be used as the baseline for the co-designed processor, in an embodiment processor 110 may be a multicore processor including a plurality of processor cores which may be a set of homogeneous cores or a collection of heterogeneous cores, such as one or more low power cores and one or more higher power cores. In addition, it is to be understood that additional processing units such as graphics processors and other specialized processing units may be present. In an embodiment, processor 110 may be configured for a particular type of ISA such as an Intel® 64 ISA. Of course other processor ISAs such as another Intel ISA, e.g., an Intel® 32 ISA or another type of ISA such as an ARM-based ISA may instead be present. Or a processor may be configured with multiple ISAs.

In the embodiment shown in FIG. 1, the various cores and other execution logic may generally be present in processor hardware 120. For purposes of performing binary translations in accordance with an embodiment of the present invention, hardware 120 includes a host entity logic 122, a protection logic 124, and a BT hardware unit 126. In various embodiments, these different logic units may be formed as collections of hardware and/or processor firmware extensions such as processor microcode configured to execute on programmable logic.

In general, host entity logic 122 may include control logic to manage the BT container in a manner transparent to software stack 190. Protection logic 124 in turn may include a register-based protection mechanism such as a range register that stores a range value, e.g., a first value and a second value, to indicate a range of memory that is dedicated to the BT container and the software therein, which thus is controlled to remain hidden from the software stack. In other embodiments, multiple registers may be present within this protection logic, including a base register to store a base value corresponding to a beginning of the protected region for the BT container and an end value to indicate the end of the protected region. In an embodiment, BT hardware unit 126 may include steering logic to enable control transfers between native code execution and binary translation execution within a BT container 130. In one such embodiment the steering logic may include or may be associated with one or more mapping tables that include a plurality of entries each to associate a native code segment and a corresponding binary translation. For example, each entry may include an entry point for a native code segment and a corresponding entry point for a binary translation, e.g., stored within a translation cache 140.

As seen further in FIG. 1, processor hardware 120 interfaces with a BT container 130. This container is an isolated and hidden virtual machine execution environment that is thus transparent to software stack 190. This hidden environment may be controlled by hardware 120 using processor firmware and/or microcode in a manner transparent to software stack 190. In the embodiment shown, container 130 includes a state storage 132 and a private memory 134. In general, state storage 132 may store processor state for use during BT operations. More specifically, this state storage may store a copy of all processor state information including status and configuration registers, general purpose registers and so forth. In some embodiments, this state storage may be multi-threaded. In addition, BT container 130 includes a private memory 134 within which the BT software may be stored. In some embodiments, this private memory may be of a multiple level hierarchy including temporary storage in one or more levels of a cache memory of the processor, and storage in a system memory.

In general, the BT software may include various components, several of which are shown in FIG. 1. Specifically, the BT software may include a translator 135 that is used to perform binary translations to enable optimizations and/or emulation of various ISA extensions. In addition, a runtime layer 136 is used during runtime to execute translated code. Still further, a system layer 138 may be configured to act as an interface between BT container 130 and the underlying processor hardware 120.

Binary translations generated by the BT software are stored in a translation cache 140. In various embodiments, BT hardware unit 126 and/or BT software may be configured to identify the presence of a corresponding binary translation for native code that is to be executed and thus cause appropriate configuring of the processor for execution of the binary translation using processor state obtained from state storage 132 within BT container 130.

Still referring to FIG. 1, software stack 190 is present and executes on processor 110. In general, software stack 190 includes a VMM layer 192, an OS layer 194 and an application layer 195. In the example shown in FIG. 1 a plurality of applications 196a-196n may be present within application layer 195. In general, these applications may be user-level applications that are used to perform tasks requested by a user.

In general, the various software of software stack 190 may execute natively on processor 120. However at least certain portions of the code such as hot code or other code such as code including instructions unsupported by the native ISA of processor 110 may benefit from binary translation. Such code may be detected, e.g., via host entity logic 122, which in turn may trigger BT container 130 to perform a binary translation and install the same within translation cache 140. As such, when an entry point to a native code portion that has been translated is encountered, at least a portion of processor hardware 120 (e.g., a single core, execution of a core or so forth) may be configured using processor state present in state storage 132 to enable execution of the translated code within translation cache 140. Although shown at this high level in the embodiment of FIG. 1, understand the scope of the present invention is not limited in this regard.

Figure 2:
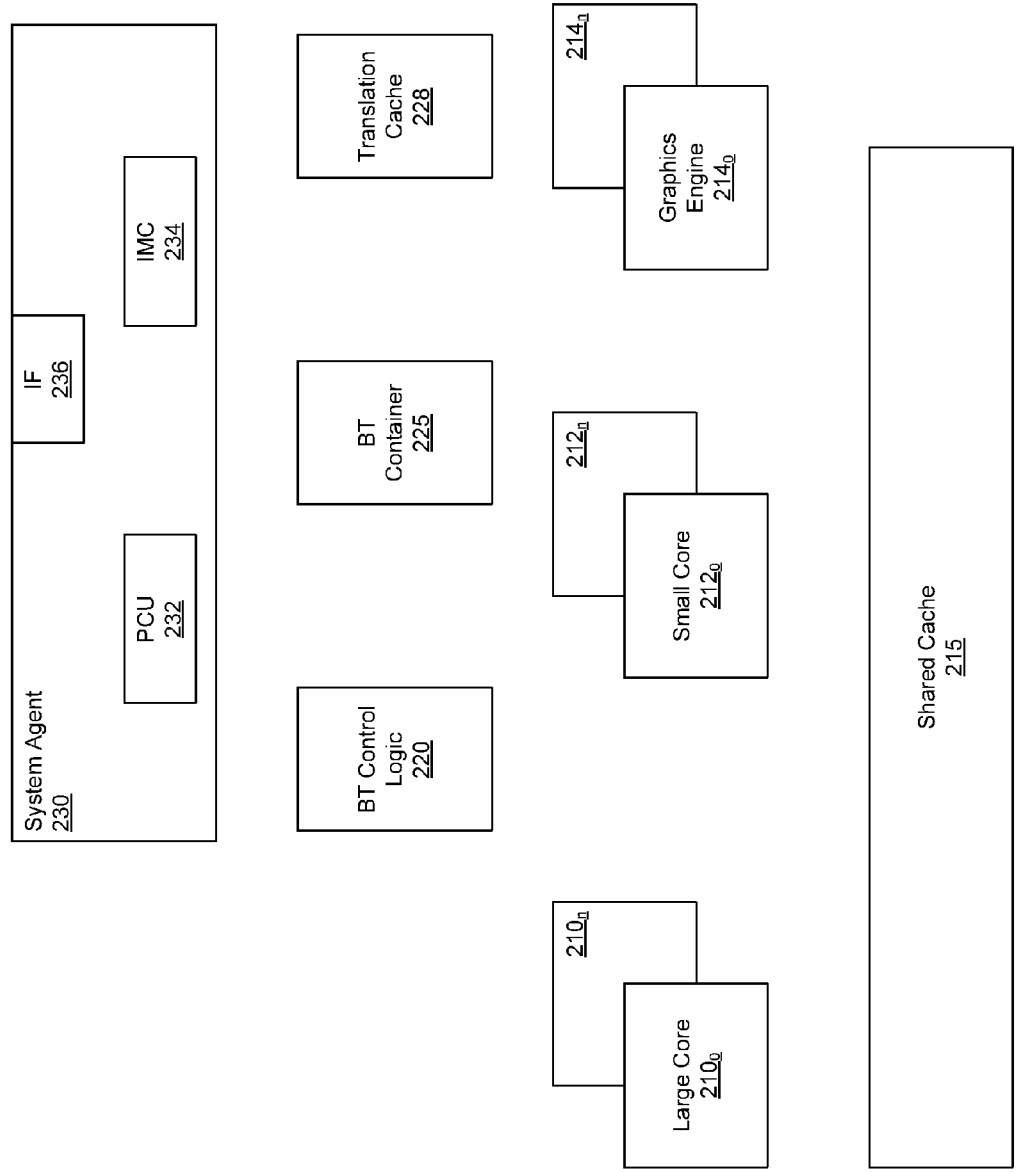
FIG. 2 is a block diagram of a co-designed processor in accordance with another embodiment of the present invention.

Referring now to FIG. 2, shown is a block diagram of a co-designed processor in accordance with another embodiment of the present invention. As shown in FIG. 2, processor 200 is a multicore processor. More particularly, processor 200 may be an asymmetric multiprocessor including different types of processing units. In the embodiment shown in FIG. 2, processor 200 includes a first plurality of cores $210_0$-$210_n$ (generically cores 210) which may be configured as large cores. By "large cores," it is meant that these cores may be configured to fully support a given ISA. For example, these cores may support a given Intel® ISA including vector support such as for advanced vector extensions (AVX) instructions. Thus the data path of one or more of the execution units within the large cores may be of a given vector width, e.g., 128 bits, 256 bits, 512 bits or another vector width. Given the relatively wide vector data path, it is possible that the large cores may consume a relatively high amount of power during execution, at least during execution of vector instructions.

Although many applications take advantage of such vector instructions, other types of applications may not leverage these instructions, and thus may not benefit from the greater power consumption of large cores 210. To this end, processor 200 further includes a plurality of small cores $212_0$-$212_n$ (generically cores 212). The term "small cores" means that these cores, which may be of a heterogeneous design from the large cores, may have lower power consumption. For example, these small cores may support a different ISA or only a subset of the ISA of the large cores. For example, small cores 212 may not provide support for vector instructions such as AVX instructions. In this way, the data path of one or more execution units of the small cores may be of a smaller width than the data path of execution units of the large cores 210.

In addition to the various types of cores, additional processing units may be present within processor 200. In the embodiment shown in FIG. 2, a plurality of graphics engines $214_0$-$214_n$ may be provided. These graphics engines may be graphics processing units (GPUs) that may be used to perform graphics processing. However understand that additional/different processing may also be performed on these graphics engines. For example, general purpose instructions can be performed in a general purpose graphics processing unit (GPGPU) model. Still further processing units may be present within processor 200 (not shown for ease of illustration in FIG. 2).

Still referring to FIG. 2, various cores and other processing units are coupled to a shared cache memory 215, which in an embodiment may be a last level cache (LLC). In some embodiments, this cache memory may be a distributed cache memory with one or more banks associated with each of the cores/graphics engines.

To effect dynamic binary operations, processor 200 further includes various hardware for controlling and performing binary translations. In the embodiment shown in FIG. 2, processor 200 includes a binary translation control logic 220 coupled to a binary translation container 225. In turn, binary translation container 225 is coupled to a translation cache 228.

In general, BT control logic 220 may be configured to directly control invocation into and exit from BT software that executes within BT container 225. For example, BT control logic 220 may be configured to identify code segments for which binary translation is appropriate, e.g., to avail of optimizations or other emulation features. Thus BT control logic 220 may instruct BT software within BT container 225 to generate a binary translation for a given code segment and to cause the BT software to store the resulting binary translation within translation cache 228. In addition, BT control logic 220 may program a steering logic (or other processor logic) to enable a control transfer to a binary translation when an entry point to a code segment for which a binary translation is available is encountered. In an embodiment, this programming may include writing an entry into a mapping table that associates native code segments and instrumented code segments.

Dynamic binary translations may be performed for various situations such as for code optimizations and ISA emulation. One particular situation is for purposes of executing code having one or more instructions that a core does not support. For example, as discussed above in one embodiment, small cores 212 may not provide support for vector instructions. However, it may be desirable when a limited number of vector instructions appear in a code segment to have this code segment execute on a small core, given the power consumption advantages of the small core as compared to the large core. Thus BT control logic 220 may cause the BT software to generate a binary translation of a code segment having, e.g., a small number of vector instructions to enable emulation of these vector instructions for execution on a given small core 212.

Still referring to FIG. 2, processor 200 further includes additional circuitry including a system agent circuit 230 which may provide overall supervisory functions such as power control for the processor via a power control unit (PCU) 232. In addition, an integrated memory controller 234 provides an interface to a system memory such as a dynamic random access memory (DRAM). System agent 230 also may include one or more interfaces 236 to enable interface to other agents of a system such as other processors of a multiprocessor system, a peripheral controller and other system components. Although shown at this high level in the embodiment of FIG. 2, understand the scope of the present invention is not limited in this regard.

Figure 3:
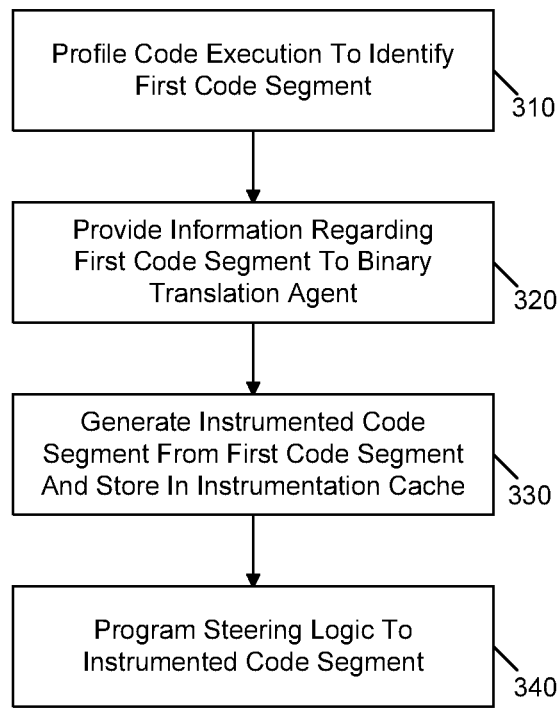
FIG. 3 is a flow diagram of a method for performing binary translations in accordance with an embodiment of the present invention.

Referring now to FIG. 3, shown is a flow diagram of a method in accordance with an embodiment of the present invention. In general method 300 of FIG. 3 may be performed by a combination of various logic of a processor to generate translated code and configure the processor to enable a control transfer to this translated code when a call is made during execution to corresponding native code for which the binary translated code has been generated.

In FIG. 3, method 300 begins by profiling code execution to identify one or more critical code segments (block 310). In the examples described herein, this profiling of code may be performed to identify hot spot code, self-modifying code, code to be emulated (e.g., for ISA instructions unsupported by a given core on which it may be executed), and so forth.

Still referring to FIG. 3, after execution proceeds and the profiling is performed, information regarding an identified code segment (e.g., a hot spot code, self-modifying code, or codes to be emulated) can be provided to a binary translation agent (block 320). As an example, this binary translation agent may be a binary translation engine as described herein. Control next passes to block 330, where an instrumented code segment can be generated from the code segment and stored in an instrumentation cache. As an example, this generation of instrumented code may include one or more emulation routines to emulate one or more instructions that are unsupported by a given core or other processing unit of the processor. In this way, the instrumented code provides an emulation function to enable emulated code to be executed at lower cost (e.g., on a lower power consuming core). In an embodiment, a time check may be made to ensure forward progress expectation of the OS and application code during the translation generation. If such an event occurs, control goes back to the native code execution. The next hotspot event brings the processor back to the translation generation task.

With continuing reference to FIG. 3, control next passes to block 340 where steering logic of the processor can be programmed to point to this instrumented code segment. That is, a steering logic such as of a BT hardware unit may include one or more mapping tables to be updated with an entry to identify a correspondence between the native code segment (namely the identified critical code segment) and the instrumented code segment that is to be executed in favor of the native code segment. This programming may thus enable the logic to perform a transfer or steering of execution from native code to instrumented code when an entry point to the now-translated native code is encountered. Although shown at this high level in the embodiment of FIG. 3, understand the scope of the present invention is not limited in this regard.

Figure 4:
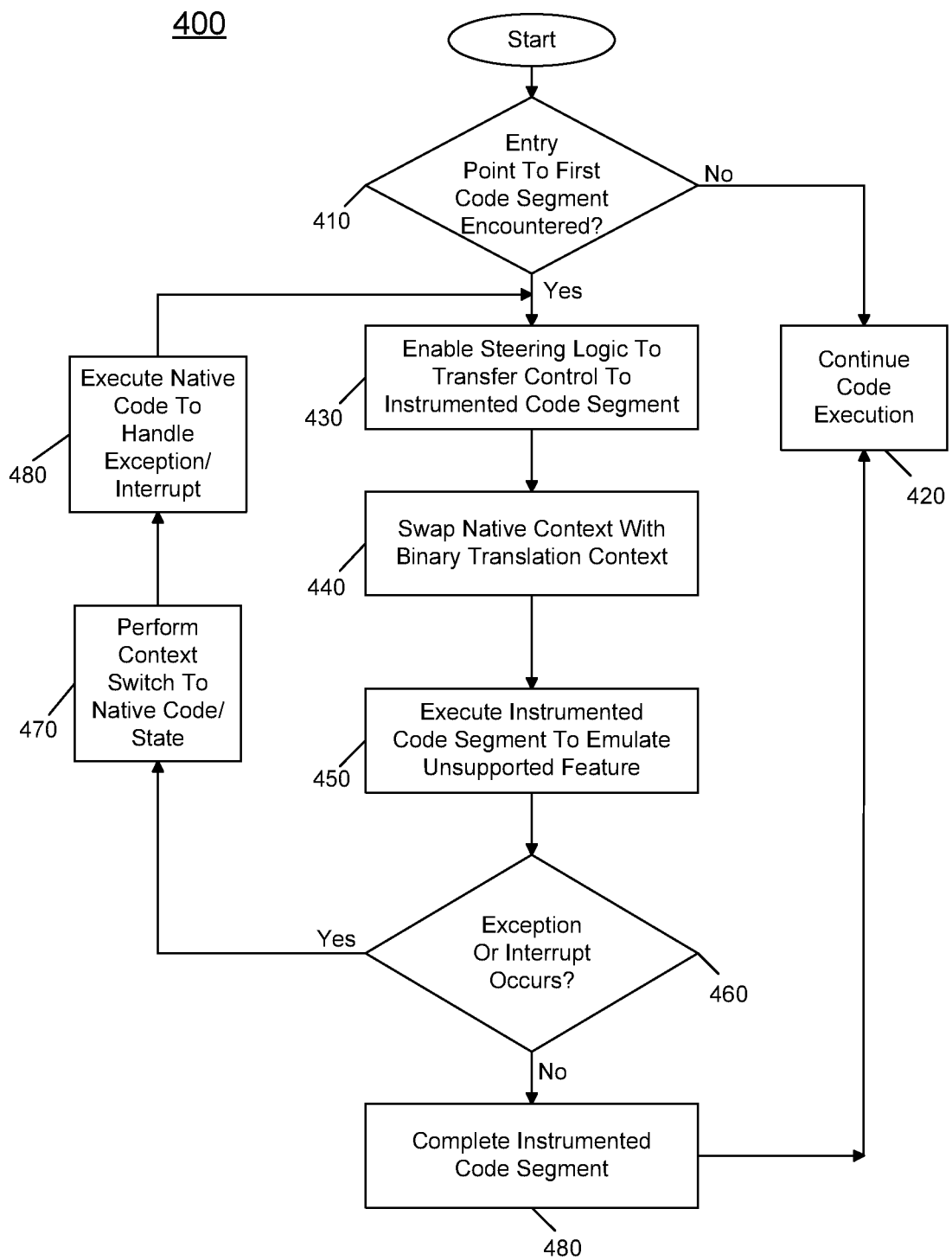
FIG. 4 is a flow diagram of a method for performing a low overhead transfer to translated code in accordance with an embodiment of the present invention.

Referring now to FIG. 4, shown is a flow diagram of a method for performing a low overhead transfer to translated code in accordance with an embodiment of the present invention. Method 400 of FIG. 4 may be executed by various logic of a processor including a BT control logic and other processor logic. As seen, method 400 may begin at diamond 410 by determining whether an entry point to a first code segment has been encountered. In an embodiment this entry point may be a call to a first instruction of a code segment for which a binary translation has been effected. If no such call is received, typical code execution may continue at block 420. Otherwise when a call to such code is received, control passes to block 430 where steering logic is enabled to transfer control to an instrumented code segment. In one embodiment, this enabling of control transfer may be effected by access to a mapping table that associates a native code segment entry point with a translated code segment entry point.

To enable execution of the binary translation, control passes to block 440 where a swap occurs between a native context stored in the processor and a binary translation context. In an embodiment, the swap may include saving a state of the processor to a processor state storage and loading a BT processor state from a BT state storage within the BT container into various registers of the processor including configuration and status register, general purpose registers and so forth. Control next passes to block 450 where the instrumented code segment can be executed to emulate an unsupported feature.

It is possible that an exception or external interrupt may occur during execution, as determined at diamond 460. If no such event occurs, the instrumented code segment may complete execution (at block 480). And accordingly, at block 420 continued execution of native code may occur.

Otherwise if such event occurs control passes to block 470. At block 470 another context switch can occur to enable the native state to be reloaded into the processor. Then control passes to block 480 where native code may execute to handle the interrupt or exception. Then if additional work is to be done for the binary translation, control passes back to block 430 discussed above for continuing execution of the binary translation. Although shown at this high level in the embodiment of FIG. 4, understand the scope of the present invention is not limited in this regard.

Figure 5:
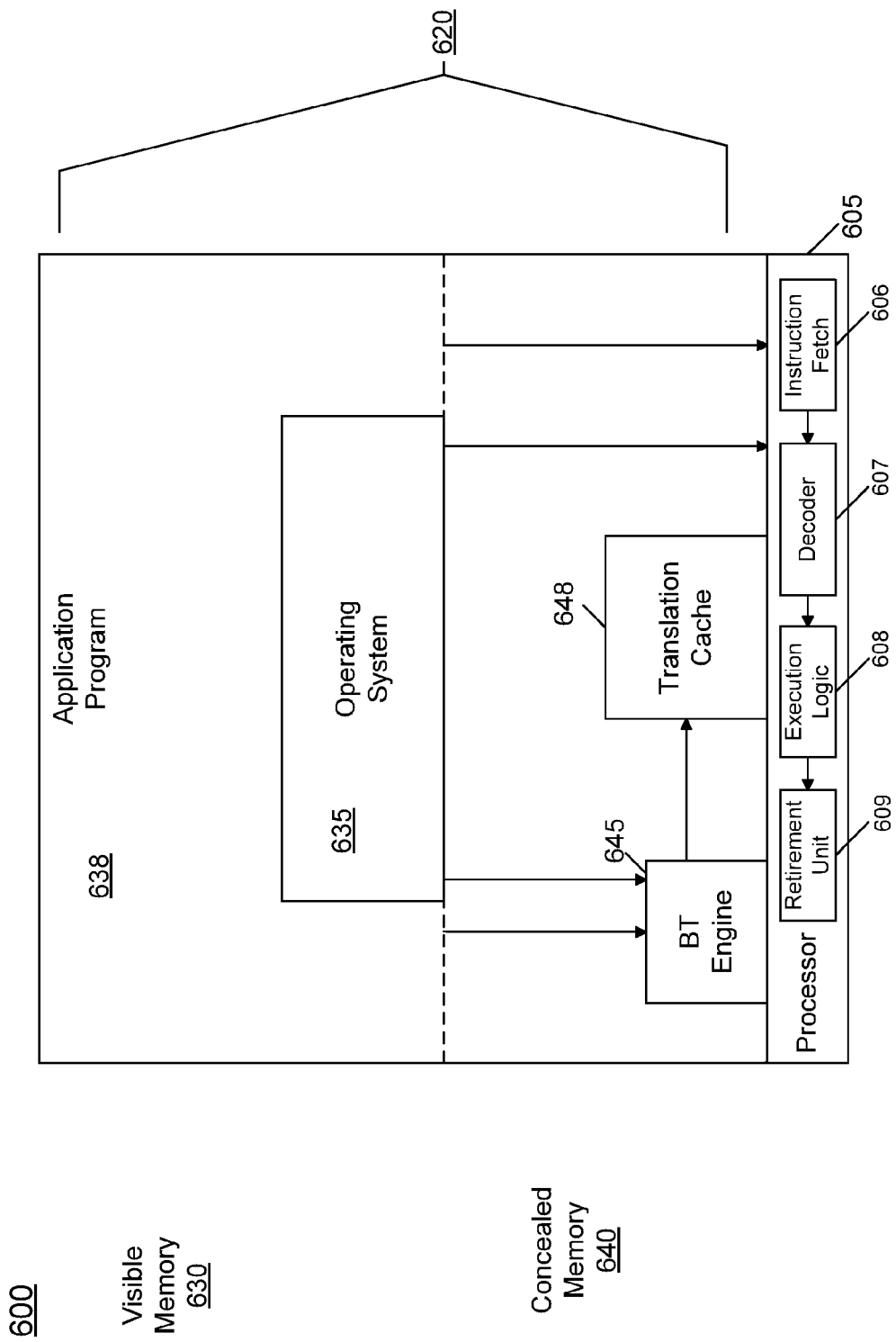
FIG. 5 is a block diagram of a co-design environment including a processor and a memory in accordance with one embodiment of the present invention.

To illustrate components of a processor implemented as a co-designed virtual machine in accordance with an embodiment of the present invention reference is made to FIG. 5. As shown in FIG. 5, a co-design environment 600 includes a processor 605 and a memory 620 which in one embodiment may be a system memory such as a dynamic random access memory (DRAM). As seen, processor 605 may have a given micro-architecture and may be coupled to memory 620 by way of, e.g., a point-to-point interconnect, bus or other such manner. In a visible portion of memory 620, namely a first portion 630, one or more operating systems 635 and application programs 638 may be stored. This portion is termed "visible" as it can be visible to user-level code (i.e., the application program 638) and visible to the OS (both OS 635 and program 638). Depending on the type of instructions to be executed in these programs, communication may be directly with processor 605, e.g., by way of using instruction decoders present in the processor to handle such instructions.

Alternately, for various code sequences that can be optimized using translated code or for such sequences in which micro-architecture support is not provided, embodiments may use a concealed portion of the memory, namely a second portion 640, in order to provide translated code to processor 605. Specifically, as seen, both OS 635 and application program 638 may communicate with a BT engine 645, which may include a runtime execution unit including interpretation, translation and optimization mechanisms. Note that concealed memory 640 is not visible or accessible to the OS or application programs. BT engine 645 may thus provide code and address information to a translation cache 648, which may include translated code that can be provided to processor 605 for execution. In one embodiment, code stored in translation cache 648 may be encrypted. This translated code may be written and optimized for the underlying micro-architecture of the processor, e.g., target ISA code.

As seen, processor 605 which may be a co-design processor, includes front end units such as an instruction fetcher 606 that can receive instructions directly from the OS or application programs. These instructions, which may be macro-instructions, e.g., corresponding to user-level instructions of an application program can be decoded using a decoder 607, which may operate to decode the instruction and access corresponding uops, e.g., present in a microcode storage of processor 605. In turn, decoder 607 may provide the uops to one or more execution units 608, which may include various arithmetic logic units (ALUs), specialized hardware and other types of computation units. Results from these instructions may be provided to a retirement unit 609, which operates to retire the instructions to thus store the results to an architectural state of the processor in program order, if no fault or exceptions occurred. While described as an in-order machine, embodiments can equally be implemented using an out-of-order machine.

Figure 6:
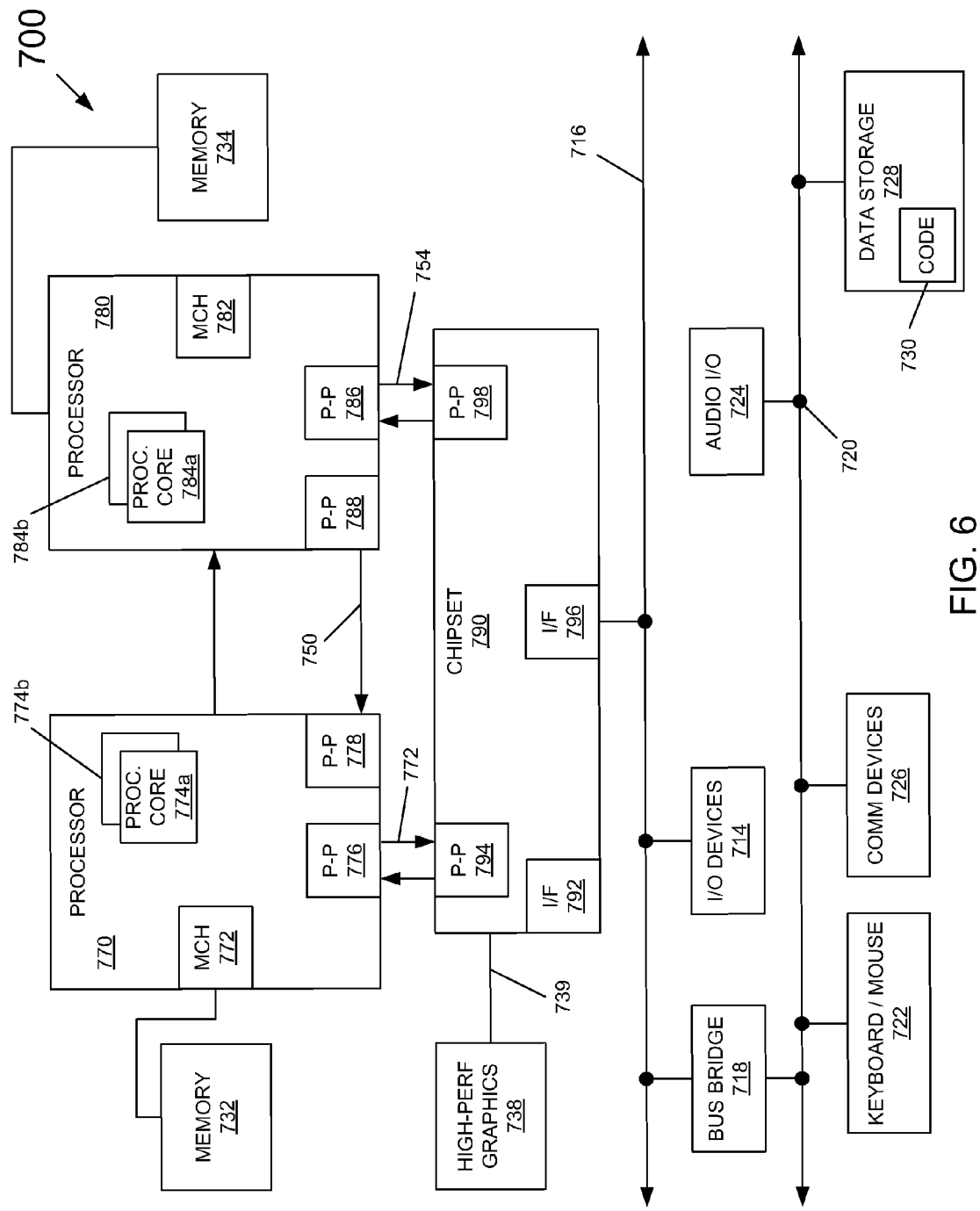
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 700 is a point-to-point interconnect system, and includes a first processor 770 and a second processor 780 coupled via a point-to-point interconnect 750. As shown in FIG. 6, each of processors 770 and 780 may be multicore processors, including first and second processor cores (i.e., processor cores 774*a* and 774*b* and processor cores 784*a* and 784*b*), although potentially many more cores may be present in the processors. Each of the processors can include logic to create and manage a BT container, as described herein.

Still referring to FIG. 6, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 6, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 6, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 6, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, or so forth.

The following examples pertain to further embodiments.

In one example, a processor comprises a first core to execute instructions of a first instruction set architecture (ISA), a second core to execute instructions of a second ISA, the second core asymmetric to the first core, and a binary translation container to be controlled transparently to a software stack by the processor, the binary translation container including a binary translation engine to receive a code segment, to generate a binary translation of the code segment, and to store the binary translation in a translation cache, the binary translation including at least one emulation routine to emulate an instruction of the first ISA that is unavailable in the second ISA, wherein the second core is to execute the binary translation.

In an example, the at least one emulation routine is to enable the second core to execute an instruction to perform an operation on a first vector operand, wherein a width of a datapath of the second core is less than a width of the first vector operand.

In an example, the processor is to profile an application including the code segment and to cause the binary translation engine to generate the binary translation responsive to the profiling.

In an example, the processor includes a mapping table including a plurality of entries each to associate a native code segment with a binary translation code segment.

In an example, the processor is to access the mapping table and to execute the binary translation instead of the code segment when an entry point to the code segment is encountered, when the mapping table includes an entry that associates the code segment with the binary translation.

In an example, the binary translation engine includes a steering logic to cause the binary translation to be executed instead of the code segment.

In an example, the second core has a lower power consumption level than the first core.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a machine-readable medium having stored thereon instructions, which if performed by a machine cause the machine to perform a method comprises receiving an instruction to perform a binary translation for a first code segment in a binary translation agent of a processor, generating an instrumented code segment for the first code segment including a first routine to emulate a first instruction of a first instruction set architecture (ISA) when executed on a core of the processor that does not support the first instruction, storing the instrumented code segment in an instrumentation cache memory, and programming the processor to enable the core to execute the instrumented code segment instead of the first code segment when an entry point to the first code segment is encountered.

In an example, the binary translation agent is transparent to a software stack that executes on the processor.

In an example, instructions to store an entry in a mapping table are to associate the entry point to a location of the instrumented code segment in the instrumentation cache memory.

In an example, instructions to store an entry in a mapping table are to cause the core to execute a second instrumented code segment instead of a second code segment, wherein the second code segment includes a hot spot.

In an example, the machine-readable medium further comprises instructions to store an entry in a mapping table to cause the core to execute a third instrumented code segment instead of a third code segment, wherein the third code segment includes self-modifying code.

In another example, a processor comprises a binary translation (BT) container including code to generate a binary translation of a first code segment and to store the binary translation in a translation cache, a host entity logic to manage the BT container and to identify the first code segment, and protection logic to isolate the BT container from a software stack, the software stack including a virtual machine monitor (VMM) layer, an operating system (OS) layer, and an application layer, wherein the BT container is transparent to the software stack.

In an example, the protection logic includes at least one register to store a range value to identify a location of the BT container.

In an example, the host entity logic is to cause a state of the processor to be stored in a first state storage, and to load a BT state stored in a BT state storage of the BT container into the processor on an entry to a BT invocation.

In an example, the host entity logic is to cause the BT state to be stored in the BT state storage of the BT container and to load the processor state from the first state storage after execution of the binary translation for a first time quantum, to enable execution of an application of the software stack.

In an example, the host entity logic is to cause the BT state to be loaded into a state storage of an idle core of the processor to enable execution of the binary translation on the idle core, where an application of the software stack executes on a second core of the processor.

In an example, the host entity logic is to prevent the BT container from access to the OS layer and the VMM layer of the software stack.

In an example, the host entity logic is to prevent the BT container from write access to the application layer of the software stack.

In an example, the host entity logic is to enable the BT container to access a first subset of a state of the processor, and to prevent the BT container from access to a second subset of the processor state.

In another example, a method comprises receiving an instruction to perform a binary translation for a first code segment in a binary translation agent of a processor, generating an instrumented code segment for the first code segment including a first routine to emulate a first instruction of a first instruction set architecture (ISA) when executed on a core of the processor that does not support the first instruction, storing the instrumented code segment in an instrumentation cache memory, and programming the processor to enable the core to execute the instrumented code segment instead of the first code segment when an entry point to the first code segment is encountered.

In an example, the binary translation agent is transparent to a software stack that executes on the processor.

In an example, the method includes storing an entry in a mapping table is to associate the entry point to a location of the instrumented code segment in the instrumentation cache memory.

In an example, the method further comprises storing an entry in a mapping table to cause the core to execute a second instrumented code segment instead of a second code segment, wherein the second code segment includes a hot spot.

In an example, the method includes storing an entry in a mapping table is to cause the core to execute a third instrumented code segment instead of a third code segment, wherein the third code segment includes self-modifying code.

In another example, a processor comprises a binary translation (BT) container means including code for generating a binary translation of a first code segment and for storing the binary translation in a translation cache, a host entity means for managing the BT container means and for identifying the first code segment, and protection means for isolating the BT container means from a software stack, the software stack including a virtual machine monitor (VMM) layer, an operating system (OS) layer, and an application layer, wherein the BT container means is transparent to the software stack.

In an example, the protection means includes at least one register to store a range value to identify a location of the BT container means.

In an example, the host entity means is to cause a state of the processor to be stored in a first state storage, and to load a BT state stored in a BT state storage of the BT container means into the processor on an entry to a BT invocation.

In an example, the host entity means is to cause the BT state to be stored in the BT state storage of the BT container means and to load the processor state from the first state storage after execution of the binary translation for a first time quantum, to enable execution of an application of the software stack.

In an example, the host entity means is to cause the BT state to be loaded into a state storage of an idle core of the processor to enable execution of the binary translation on the idle core, wherein an application of the software stack executes on a second core of the processor.

In an example, the host entity means is to prevent the BT container from access to the OS layer and the VMM layer of the software stack.

In an example, the host entity means is to prevent the BT container from write access to the application layer of the software stack.

In an example, the host entity means is to enable the BT container to access a first subset of a state of the processor, and to prevent the BT container from access to a second subset of the processor state.

In another example, a computer readable medium including instructions is to perform the method of any of the above examples.

In another example, an apparatus comprises means for performing the method of any one of the above examples.

In an example, a communication device is arranged to perform the method of any one of the above examples.

In an example, at least one machine readable medium comprising a plurality of instructions that in response to being executed on a computing device, cause the computing device to carry out a method according to any one of the above examples.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first core to execute instructions of a first instruction set architecture (ISA);
a second core to execute instructions of a second ISA, the second core asymmetric to the first core; and
a binary translation container to be controlled in a manner transparent to a software stack by the processor, the binary translation container including a binary translation engine to receive a code segment, to generate a binary translation of the code segment, and to store the binary translation in a translation cache, the binary translation including at least one emulation routine to emulate an instruction of the first ISA that is unavailable in the second ISA, wherein the second core is to execute the binary translation.

2. The processor of claim 1, wherein the at least one emulation routine is to enable the second core to execute an instruction to perform an operation on a first vector operand, wherein a width of a datapath of the second core is less than a width of the first vector operand.

3. The processor of claim 1, wherein the processor includes a mapping table including a plurality of entries each to associate a native code segment with a binary translation code segment.

4. The processor of claim 3, wherein the processor is to access the mapping table and to execute the binary translation instead of the code segment when an entry point to the code segment is encountered, when the mapping table includes an entry that associates the code segment with the binary translation.

5. The processor of claim 1, wherein the binary translation engine includes a steering logic to cause the binary translation to be executed instead of the code segment.

6. The processor of claim 1, wherein the second core has a lower power consumption level than the first core.

7. A non-transitory machine-readable medium having stored thereon instructions, which if performed by a machine cause the machine to perform a method comprising:
receiving an instruction to perform a binary translation for a first code segment in a binary translation agent of a processor, wherein the binary translation agent is managed by a control logic of the processor to be transparent to a software stack that executes on the processor;
generating an instrumented code segment for the first code segment including a first routine to emulate a first instruction of a first instruction set architecture (ISA) when executed on a core of the processor that does not support the first instruction;
storing the instrumented code segment in an instrumentation cache memory; and
programming the processor to enable the core to execute the instrumented code segment instead of the first code segment when an entry point to the first code segment is encountered.

8. The non-transitory machine-readable medium of claim 7, further comprising instructions to store an entry in a mapping table to associate the entry point to a location of the instrumented code segment in the instrumentation cache memory.

9. The non-transitory machine-readable medium of claim 7, further comprising instructions to store an entry in a mapping table to cause the core to execute a second instrumented code segment instead of a second code segment, wherein the second code segment includes a hot spot.

10. The non-transitory machine-readable medium of claim 7, further comprising instructions to store an entry in a mapping table to cause the core to execute a third instrumented code segment instead of a third code segment, wherein the third code segment includes self-modifying code.

11. A processor comprising:
a binary translation (BT) container including code to generate a binary translation of a first code segment and to store the binary translation in a translation cache;
a host entity logic to manage the BT container and to identify the first code segment; and
protection logic to isolate the BT container from a software stack, the software stack including a virtual machine monitor (VMM) layer, an operating system (OS) layer, and an application layer, wherein the host entity logic is to manage the BT container to be transparent to the software stack.

12. The processor of claim 11, wherein the protection logic includes at least one register to store a range value to identify a location of the BT container.

13. The processor of claim 11, wherein the host entity logic is to cause a state of the processor to be stored in a first state storage, and to load a BT state stored in a BT state storage of the BT container into the processor on an entry to a BT invocation.

14. The processor of claim 13, wherein the host entity logic is to cause the BT state to be stored in the BT state storage of the BT container and to load the processor state from the first state storage after execution of the binary translation for a first time quantum, to enable execution of an application of the software stack.

15. The processor of claim 13, wherein the host entity logic is to cause the BT state to be loaded into a state storage of an idle core of the processor to enable execution of the binary translation on the idle core, wherein an application of the software stack executes on a second core of the processor.

16. The processor of claim 11, wherein the host entity logic is to prevent the BT container from access to the OS layer and the VMM layer of the software stack.

17. The processor of claim 11, wherein the host entity logic is to prevent the BT container from write access to the application layer of the software stack.

18. The processor of claim 11, wherein the host entity logic is to enable the BT container to access a first subset of a state of the processor, and to prevent the BT container from access to a second subset of the processor state.

19. The processor of claim 2, wherein the binary translation engine is to generate the binary translation including the at least one emulation routine when the code segment includes less than a threshold number of vector instructions.

* * * * *